3,314,995
ALKYLENE OXIDE ADDUCTS OF BIS(2,4-DI-
AMINO-5-METHYL PHENYL)METHANE
James M. Cross, New Martinsville, Clyde D. Campbell, Wheeling, and Sidney Metzger, New Martinsville, W. Va., assignors to Mobay Chemical Company, Pittsburgh, Pa., a corporation of Delaware
No Drawing. Filed Dec. 9, 1963, Ser. No. 329,213
7 Claims. (Cl. 260—570)

This invention relates to new chemical compositions and more particularly, to compositions which have useful application as intermediates in the preparation of foams.

It is therefore an object of this invention to provide new chemical compositions. It is another object of this invention to provide compositions useful in the preparation of foams. It is another object of this invention to provide compositions containing active hydrogen atoms.

The foregoing objects and others which will become apparent from the following description are accomplished in accordance with the invention generally speaking by providing alkylene oxide adducts of bis(2,4-diamino-5-methyl phenyl)methane wherein at least two primary amino hydrogen atoms are oxyalkylated. Thus, the invention contemplates compounds exemplified by the following general formula:

containing amino groups are particularly suitable for sprayed urethane foams because of the speed with which these materials set up. Such foams are useful in covering the underside of horizontal surfaces where it is difficult to maintain the sprayed material in position.

Bis(2,4-diamino-5-methyl phenyl)methane is prepared by reacting 2,4-tolylene diamine with formaldehyde in accordance with the disclosure found in Berichte vol. 33, page 915 (1900). The compositions in accordance with this invention are prepared by reacting with bis(2,4-diamino-5-methyl phenyl)methane at least two mols of an alkylene oxide. Depending upon the quantity based on an equivalent ratio of the alkylene oxide used in the reaction, the number of the hydrogen atoms which will replace the nitrogen atoms by the alkylene oxide residue is determined. When the equivalent ratio is 8 or more, all of the reactive hydrogen atoms are replaced. When the equivalent ratio is 4:1 all of the primary amino hydrogen atoms are replaced. In other words, at least one hydrogen atom on every nitrogen atom is replaced by an alkylene oxide residue. By alkylene oxide residue is meant a radical having the formula

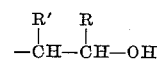

wherein R and R' are hydrogen, alkyl or aryl. The reac-

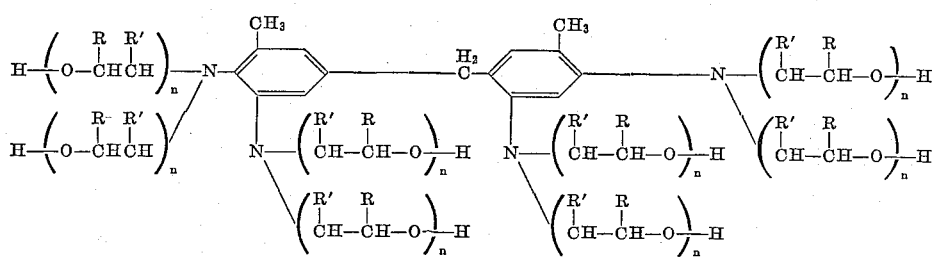

wherein R and R' are hydrogen, alkyl or aryl; and R' is preferably hydrogen; n is either 0 or a positive integer and is a positive integer on different nitrogen atoms at least twice replaced by the residue of an alkylene oxide. Of course, any amount of substitution greater than two and up to 8 is contemplated and is within the purview of this invention. Also, in accordance herewith, the products resulting from the condensation of the hydroxyl groups of each alkylene oxide radical, which reacts with each hydrogen of the amino groups, with further amounts of alkylene oxides whether they be the same or different is within the contemplated scope of this invention. Thus, polyethers are formed where an alkylene oxide is reacted equivalent for equivalent with the amino hydrogen atoms of the tetraamine and this material is further condensed with more alkylene oxide. The alkylene oxide adducts of the invention are useful as solvents, non-ionic detergents and as valuable intermediates in the preparation of foams. Because of their polyfunctional nature, the compounds are particularly suited for reaction with diisocyanates in the preparation of rigid foams. The adducts tion between the bis (2,4-diamino-5-methyl phenyl)methane and the alkylene oxide can be conducted in the presence of a suitable inert solvent in which the bis(2,4-diamino-5-methyl phenyl)methane is slurried or dissolved. The alkylene oxide is then introduced with agitation of the entire body which is heated to a temperature of about 90° C. to about 170° C. The reaction is carried out under atmospheric or super-atmospheric pressure and to the extent required any exothermic heat can be removed by any conventional heat transfer means. Any suitable solvent which permits a sufficiently high reaction temperature such as toluene, xylylene, diethyl carbitol, dibutyl carbitol, dibutyl ether or the like can be used in conducting the reaction.

Any suitable alkylene oxide or mixture of alkylene oxides can be used in the preparation of the compositions in accordance with this invention such as, for example, ethylene oxide, 1,2-propylene oxide, styrene oxide, 1,2-butylene oxide, 1,2-hexylene oxide, 1,2-heptylene oxide, epichlorohydrin, 2,3-butylene oxide, 3,4-hexylene oxide and the like.

The amount of alkylene oxide used in reaction with the bis(2,4-diamino-5-methyl phenyl)methane is determined by the average molecular weight of the product desired. For adducts described herein which have utility as intermediates in the preparation of foams, the molecular weights based on the hydroxyl value can range from 344 to about 10,000 or more. To obtain such products having the desired molecular weight, the bis(2,4-diamino-5-methyl phenyl)methane is treated with an alkylene oxide in accordance with the procedure set forth above and in the ratios desired if less than all of the active hydrogen atoms on the nitrogen atoms are replaced. Where higher molecular weight compounds are desired the alkylene oxide is further reacted with the hydroxyl groups present after reaction of one equivalent of an alkylene oxide with each hydrogen on the nitrogen atoms. The quantity of alkylene oxide reacted with each hydroxyl group of each product can range from 1 to about 100 mols or more. In the second instance, that is, where the alkylene oxides are reacted with hydroxyl groups rather than with the amino groups, it is desirable that a catalyst be present in order to promote this reaction. Any suitable catalyst can be used, however, it is preferred to use alkaline catalysts such as, for example, alkali metal catalysts including sodium hydroxide, potassium hydroxide, potassium t-butoxide and the like. The amount of catalyst employed is generally in the range of 0.002 to 2.0 percent by weight based on the total amount of reactants including the alkylene oxide or mixtures thereof appearing in the reaction product. Thus, in accordance with the formula represented above, the value of $n$ can range from 0 to 100 or more, must equal at least 1 at least twice in the molecule. In the first step of the procedure, that is, wherin an alkylene oxide is reacted with amino groups no catalyst is necessary however, when conducting the reaction in order to prepare a polyether it is preferred to utilize a catalyst as stated above. The catalyst may be added either initially or after the formation of the reaction product of amino groups with alkylene oxides.

The compositions in accordance with this invention also includes block polymers wherein initially one alkylene oxide is reacted with the bis(2,4-diamino-5-methyl phenyl) methane and then subsequently in the presence of a catalyst, a different alkylene oxide is reacted with the product prepared from the first reaction. An example of this would be where ethylene oxide is first reacted with all of the amino groups present and then subsequently propylene oxide is reacted with the hydroxyl groups formed by the reaction of ethylene oxide with the tetraamine. Of course, any combination of the above mentioned alkylene oxides may be used. Further, mixed copolymers can be prepared by reacting a mixture of alkylene oxides such as, ethylene oxide and propylene oxide with the tetraamine.

The average molecular weight and reactivity of the alkylene oxide adducts prepared herein can be determined readily by analysis for hydroxyl content. The hydroxyl number is a measure of and is proportional to the hydroxyl concentration per unit weight. The hydroxyl number is defined in terms of milligrams of KOH equivalent per gram of alkylene oxide-bis(2,4-diamino-5-methyl phenyl) methane reaction product and is determined by reacting acetic anhydride or phthalic anhydride (in pyridine solution) at refluxing temperature with the hydroxyl groups of the reaction product. The unreacted anhydride and acetic acid or phthalic acid formed are titrated with aqueous sodium hydroxide using phenolphthalein as an indicator. The molecular weight can be readily calculated from the hydroxyl number by using the formula:

$$M.W. = \frac{\text{Functionality} \times 1000 \times 56.1}{\text{Hydroxyl No.}}$$

In the preparation of cellular polyurethanes utilizing the alkylene oxide adducts of bis(2,4-diamino-5-methyl phenyl)methane, any suitable blowing agent may be used which causes the reaction mixture to expand by the generation of gas during the isocyanate polyaddition reaction. The blowing agent may be water which reacts with isocyanates to produce carbon dioxide, a temperature sensitive blowing agent such as, for example, a halohydrocarbon including trichlorofluoromethane, dichlorodichloromethane, trichlorotrifluoroethane, dichlorodifluoromethane and the like, an alkane such as butane, hexane, heptane and the like, methylene chloride or any other suitable blowing agent and mixtures thereof.

Any suitable organic polyisocyanate may be used in the practice of this invention such as, for example, ethylene diisocyanate,
propylene diisocyanate,
tetramethylene diisocyanate,
pentamethylene diisocyanate,
octamethylene diisocyanate,
undecamethylene diisocyanate,
dodecamethylene diisocyanate,
3,3'-diisocyanato dipropylether, and so forth;

cyclopentylene-1,3-diisocyanate,
cyclohexylene-1,4-diisocyanate,
2,4-tolylene diisocyanate,
2,6-tolylene diisocyanate and mixtures of 2,4- and 2,6-tolylene diisocyanate,
xylylene-1,4-diisocyanate,
xylylene-1,3-diisocyanate,
4,4'-diphenylmethane diisocyanate,
2-nitrodiphenyl-4,4'-diisocyanate,
4,4'-diphenylpropane diisocyanate,
p-isocyanato benzyl isocyanate,
m-phenylene diisocyanate,
p-phenylene diisocyanate,
naphthylene-1,4-diisocyanate,
naphthylene-1,5-diisocyanate,
furfurylidene diisocyanate,
p,p',p''-triphenylmethane triisocyanate,
diphenyl-4,6,4'-triisocyanate, and the like. Also, suitable are crude polyisocyanates such as crude 4,4'-diphenylmethane diisocyanate which is generally referred to as a polyaryl alkylene polyisocyanate. Any such compound including those disclosed in U.S. Patent 2,683,730 may also be used in the process of this invention. In addition to the reactants set forth above, other known accelerators, stabilizers, emulsifiers and the like may be incorporated into the reaction mixture to achieve the results currently attributed to them.

The cellular polyurethane in accordance with this invention are particularly suitable in the manufacture of rigid polyurethane foams which find application in sound and heat insulation, curtain wall constructions, for filling large volumes such as airplane wings and the like.

The invention is further illustrated but not limited by the following examples in which parts are by weight unless otherwise specified.

EXAMPLE 1

About 102.4 parts of bis(2,4-diamino-5-methyl phenyl) methane are slurried with about 156.7 parts of diethyl carbitol in a 3-necked flask equipped with a mechanical stirrer, thermometer, a bubbler for the introduction of ethylene oxide beneath the surface of the slurry and an acetone-Dry Ice condenser. The slurry is heated to about 170° C. and the ethylene oxide addition is begun. The reaction temperature is held between approximately 145 and 155° C. with vigorous agitation throughout the course of the reaction. A total of about 156 parts of ethylene oxide is added and reacted quite readily following a brief induction period. At the conclusion of the ethylene oxide addition, the product separates from the diethyl carbitol as a dark, viscous liquid. The diethyl carbitol is removed by vacuum distillation and about 239 parts of the product are obtained. The product is a semi-solid green-black mass with an oil-like odor. The product upon analysis shows a hydroxyl number of 705. The molecular weight as calculated from the hydroxyl number is 636. A theoretical molecular weight based on the amount of ethylene oxide added is 646.

EXAMPLE 2

About 51.2 parts of bis(2,4-diamino-5-methyl phenyl)methane is introduced into a 3-necked reaction flask equipped with a mechanical stirrer, a calibrated dropping funnel, thermometer and an acetone-Dry Ice condenser. About 60.9 parts of diethyl carbitol is added to obtain a thin slurry which is heated until complete solution is effected. This occurs at about 172° C. At this time, propylene oxide is added drop-wise from the dropping funnel and the temperature is held between 160 and 170° C. with vigorous agitation until a total of about 97.8 parts of propylene oxide has been added. After the propylene oxide has been added, the mixture is allowed to react an additional two hours at about 120° C. The diethyl carbitol is removed and about 137 parts of the crude product is obtained. This product is a dark liquid when warm and a brittle solid when cool. It is easily ground into a yellow-brown powder. The hydroxyl number is 596.4. The theoretical molecular weight based on the amount of propylene oxide is 784. That calculated from the hydroxyl number is 752.

EXAMPLE 3

*Preparation of a polyether.*—To about 182.4 parts of diethyl carbitol is added about 121.6 parts of the product formed from the reaction of 1 mol of bis(2,4-diamino-5-methyl phenyl)methane with 8 mols of ethylene oxide. This product has a molecular weight of 608 and a hydroxyl number of 737. To this mixture is added about 4.03 parts of potassium hydroxide, and the mixture is heated to about 150° C. To this mixture, maintained at about 150° C. and at about 20 mm. pressure (abs.) is gradually added approximately 285 parts of ethylene oxide. The resulting product is a polyether having a molecular weight of about 2018 and a hydroxyl number of 223.

EXAMPLE 4

*Preparation of a polyether.*—To about 371.2 parts of diethyl carbitol is added about 144 parts of the product formed from the reaction of 1 mol of bis(2,4-diamino-5-methyl phenyl)methane with 8 mols of propylene oxide. The product has a molecular weight of 120 and an hydroxyl number of 623. To this mixture is added 5.15 grams of potassium hydroxide and the mixture is heated to 160–170° C. To this mixture, maintained at about 160–170° C. and at about 20 mm. pressure (abs.) is gradually added approximately 371 parts of propylene oxide. The resulting product is a polyether having a molecular weight of about 2520 and a hydroxyl number of 178.

EXAMPLE 5

*The preparation of a condensation product of one mol of bis(2,4-diamino-5-methyl phenyl)methane with two mols of propylene oxide.*—About 51.2 parts (0.2 mol) of bis(2,4-diamino-5-methyl phenyl)methane is slurried with about 60.4 parts of diethyl carbitol and heated to about 172° C. to effect solution. With the temperature maintained at about 160–170° C. about 23.2 parts of propylene oxide (0.4 mol) is added dropwise to this solution with vigorous stirring. About 74 grams of product are obtained. This product has a molecular weight of about 372 and is a compound of the following structure: a 2-hydroxy propyl group attached to each of two of the amino groups of bis(2,4-diamino-5-methyl phenyl)methane thus allowing two primary amino groups to remain unreacted.

EXAMPLE 6

*Bis(2,4-diamino-5-methyl phenyl)methane with two mols of ethylene oxide.*—The procedure of Example 5 is conducted using the following parts, ingredients and conditions in place of those of Example 5.

| | Parts |
|---|---|
| Diethyl carbitol | 78.4 |
| Bis(2,4-diamino-5-methyl phenyl)methane | 51.2 |
| Ethylene oxide (0.4 mol) | 17.6 |
| Reaction temperature 145–155° C. | |

About 68 parts of product are obtained. The product has a molecular weight of 344 and the following structure: a hydroxy ethyl group attached to each of two of the amino groups of bis(2,4-diamino-5-methyl phenyl)methane thus allowing two primary amino groups to remain unreacted.

EXAMPLE 7

*The preparation of a condensartion product of one mol of bis(2,4-diamino-5-methyl phenyl)methane with 4 mols of propylene oxide.*—About 51.2 parts (0.2 mol) of bis(2,4-diamino-5-methyl phenyl)methane is slurried with about 60.9 parts of diethyl carbitol and heated to about 172° C. to effect solution. With the temperature maintained at about 160–170° C., about 46.4 parts of propylene oxide is added dropwise to this solution with vigorous stirring. About 97 parts of product are obtained. This product has a molecular weight of 488 and is a compound of the following structure: a 2-hydroxy propyl group attached to each of the four amino groups of bis(2,4-diamino-5-methyl phenyl)methane resulting in a molecule with 4 secondary hydroxyl groups and 4 secondary amino groups.

EXAMPLE 8

The procedure of Example 7 is conducted except the reactants and conditions set forth below are used instead of those of Example 7.

| | Parts |
|---|---|
| Diethyl carbitol | 78.4 |
| Bis(2,4-diamino-5-methyl phenyl)methane | 51.2 |
| Ethylene oxide (0.8 mol) | 35.2 |
| Reaction temperature 145–155° C. | |

About 86 parts of product are obtained. The product has a molecular weight of 432 and consists essentially of the following structure: a hydroxy ethyl group attached to each of the four amino groups of bis(2,4-diamino-5-methyl phenyl)methane resulting in a molecule with 4 primary hydroxyl groups and 4 secondary amino groups.

EXAMPLE 9

*The preparation of a condensation product of one mol of bis(2,4-diamino-5-methyl phenyl)methane with 6 mols of propylene oxide.*—About 51.2 parts (0.2 mol) of bis(2,4-diamino-5-methyl phenyl)methane is slurried with about 60.9 parts of diethyl carbitol and heated to about 172° C. to effect solution. With the temperature maintained at about 160–170° C. about 69.6 parts (1.2 mols) of propylene oxide is added dropwise to this solution with vigorous stirring. About 120 parts of product are obtained. The product has a molecular weight of 610 and is a compound of the following structure: two 2-hydroxy propyl groups attached to two of the amino groups of bis(2,4-diamino-5-methyl phenyl)methane and one such group attached to each of the two other amine groups, resulting in a molecule with 6 secondary hydroxyl groups, 2 tertiary amino groups and 2 secondary amino groups.

EXAMPLE 10

The procedure of Example 9 is conducted using the following reactants in the approximate parts indicated and under the conditions specified.

| | Parts |
|---|---|
| Diethyl carbitol | 78.4 |
| Bis(2,4-diamino-5-methyl phenyl)methane | 51.2 |
| Ethylene oxide (1.2 mols) | 52.8 |

Reaction temperature 145–155° C.

About 104 parts of product are obtained. The product has a molecular weight of 520 and has the following structure: two hydroxy ethyl groups attached to two of the amine groups of bis(2,4-diamino-5-methyl phenyl) methane and one such group attached to each of the two other amino groups, resulting in a molecule with 6 primary hydroxyl groups, 2 tertiary amino groups and 2 secondary amino groups.

EXAMPLE 11

*The preparation of a urethane foam from the product of Example 3.*—A mixture of about 100 parts of the product of Example 3, about 15 parts of dichlorodifluoromethane, 1 part of a siloxane oxyalkylene block polymer having the formula

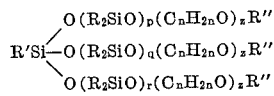

about 0.26 part of triethylene diamine is prepared. While this mixture is being vigorously stirred, about 35.4 parts of an isomeric mixture of 80% 2,4- and 20% 2,6-tolylene diisocyanate is added and the entire mixture is stirred rapidly until complete mixing of all the components is assured. The finished product is a rigid urethane foam.

EXAMPLE 12

*The preparation of a urethane foam from the product of Example 5.*—About 100 parts of the product of Example 5, about 15 parts of dichlorodifluoromethane, about 1 part of a siloxane oxyalkylene block polymer having the formula $$C_2H_5-Si\left[-O-\left(\underset{CH_3}{\underset{|}{\overset{CH_3}{\overset{|}{Si}}}}O\right)_6-(C_nH_{2n}O)_{30}C_4H_9\right]_3$$

wherein $(C_nH_{2n}O)$ is a mixed polyoxyethylene and oxypropylene block copolymer containing about 17 oxyethylene units and about 13 oxypropylene units and about 0.2 part of triethylene diamine are mixed together. While this mixture is being vigorously stirred, about 93.5 parts of an isomeric mixture of 80% 2,4- and 20% 2,6-tolylene diisocyanate is added and rapid mixing is continued. This mixture is then poured into a suitable mold and results in a rigid urethane foam containing urea linkages.

It is of course to be understood that any of the alkylene oxine adducts of bis(2,4-diamino-5-methyl phenyl) methane set forth above can be utilized in the working examples for those more specifically set forth herein in that the invention is not to be limited to these examples.

Although the invention has been described in considerable detail for the purpose of illustration, it is to be understood that variations can be made by those skilled in the art without departing from the spirit of the invention and scope of the claims.

What is claimed is:

1. Bis(2,4-diamino-5-methyl phenyl)methane at least two primary amino hydrogen atoms of which are oxyalkylated.

2. Alkylene oxide adducts having the formula:

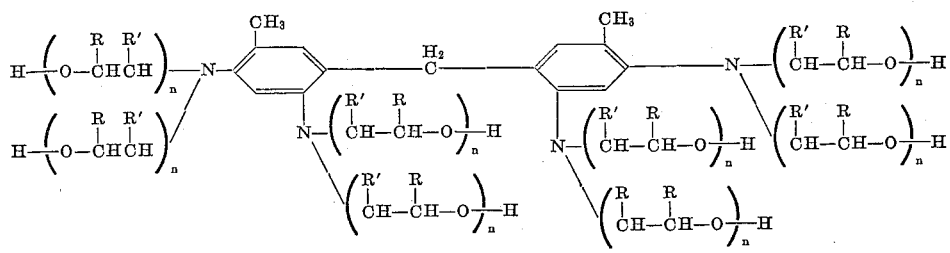

wherein R, R' and R" are alkyl radicals having one to four carbon atoms; $p$, $q$ and $r$ are integers each having a value of from four to eight and $(C_nH_{2n}O)_z$ is a mixed polyoxyethylene oxypropylene group containing from 15 to 19 oxyethylene units and from 11 to 15 oxypropylene units with $z$ equal to from about 26 to about 34, and wherein R and R' are members selected from the group consisting of hydrogen, lower alkyl and phenyl and $n$ is selected from the group consisting of 0 and a positive integer and is a positive integer on different nitrogen atoms at least twice in the molecule.

3. Alkylene oxide adducts having the formula:

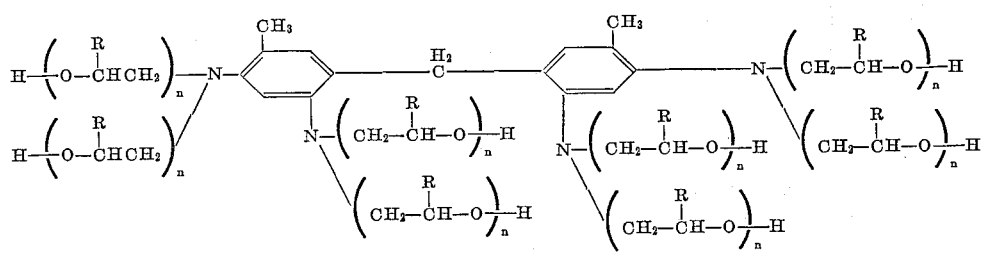

wherein R is a member selected from the group consisting of hydrogen, lower alkyl and phenyl and $n$ is selected from the group consisting of 0 and a positive integer and is a positive integer on different nitrogen atoms at least twice in the molecule.

4. Bis(2,4-diamino-5-methyl phenyl)methane oxyalkylated at least once on each amino group.

5. Alkylene oxide adducts having the formula:

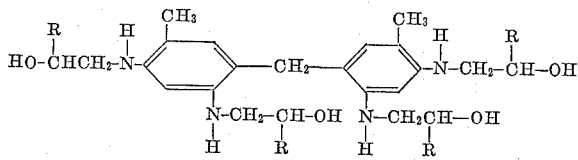

wherein R is selected from the group consisting of hydrogen, lower alkyl and phenyl.

6. Alkylene oxide adducts having the formula:

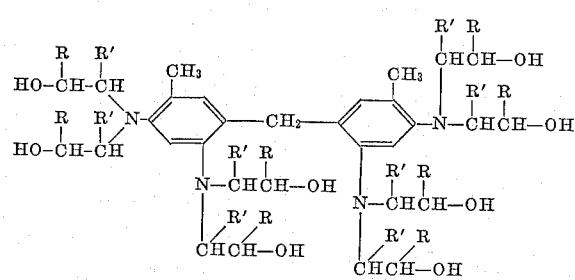

wherein R and R' are members selected from the group consisting of H, lower alkyl and phenyl.

7. Alkylene oxide adducts having the formula:

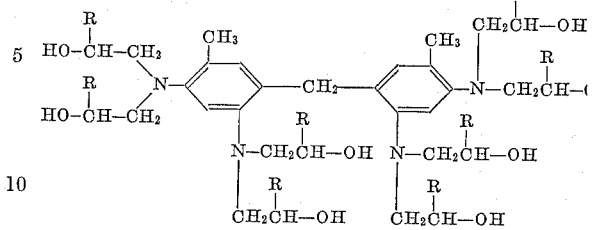

wherein R is selected from the group consisting of lower alkyl and phenyl.

References Cited by the Examiner

UNITED STATES PATENTS

| 3,012,008 | 12/1961 | Lister | 260—5' |
| 3,075,927 | 1/1963 | Lanham | 260—2 |
| 3,075,928 | 1/1963 | Lanham | 260—2 |
| 3,097,191 | 7/1963 | France et al. | 260—5' |
| 3,200,152 | 8/1965 | Ruppert et al. | 260—5' |
| 3,202,711 | 8/1965 | Fruhstorfer et al. | 260—5' |

FOREIGN PATENTS

| 1,060,140 | 6/1959 | Germany. |
| 910,333 | 11/1962 | Great Britain. |

CHARLES B. PARKER, *Primary Examiner.*

LEON J. BERCOVITZ, *Examiner.*

J. J. KLOCKO, R. V. HINES, *Assistant Examiners.*